US006363316B1

(12) United States Patent
Soliman et al.

(10) Patent No.: US 6,363,316 B1
(45) Date of Patent: Mar. 26, 2002

(54) CYLINDER AIR CHARGE ESTIMATION USING OBSERVER-BASED ADAPTIVE CONTROL

(75) Inventors: Ihab S. Soliman, Dearborn, MI (US); Jerry Dean Robichaux, Tuscon, AZ (US); Tobias John Pallett, Ypsilanti, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/642,958

(22) Filed: Aug. 21, 2000

Related U.S. Application Data

(60) Provisional application No. 60/240,943, filed on May 13, 2000.

(51) Int. Cl.[7] .......................... G06F 15/48; F02D 41/14

(52) U.S. Cl. ........................ 701/104; 123/399; 123/480

(58) Field of Search ................................ 701/104, 114, 701/115, 102; 123/399, 361, 402, 403, 478, 480, 488, 494; 73/117.3, 118.2

(56) References Cited

U.S. PATENT DOCUMENTS 4,492,195 A * 1/1985 Takahashi et al. .......... 123/339
4,785,780 A * 11/1988 Kawai ........................ 701/107
4,995,364 A * 2/1991 Kamei et al. ............... 123/478
5,190,020 A * 3/1993 Cho ........................... 123/478
5,270,935 A * 12/1993 Dudek et al. ............... 701/104
5,273,019 A * 12/1993 Matthews et al. .......... 123/571

* cited by examiner

*Primary Examiner*—John Kwon
*Assistant Examiner*—Hieu T. Vo
(74) *Attorney, Agent, or Firm*—John D. Russell

(57) ABSTRACT

A system and method for controlling an internal combustion engine to improve air/fuel ratio control particularly during transient operating modes include estimating cylinder air charge during a future fuel injection event. The system and method use a dynamic airflow actuator position model to determine future actuator position which is then used by an airflow model and manifold filling model to provide the estimated future cylinder air charge. The system and method use observer-based and adaptive control to compensate for modeling errors and sensor dynamics while assuring stability and accurate prediction of airflow actuator position and airflow.

25 Claims, 7 Drawing Sheets

CYLINDER AIR CHARGE ESTIMATION USING OBSERVER-BASED ADAPTIVE CONTROL

CROSS-REFERENCE TO RELATED APPLICATIONS

This application claims priority to provisional application Ser. No. 60/240,943 filed May 13, 2000 entitled "Cylinder Air Charge Estimation Using Observed-Based Adaptive Control".

TECHNICAL FIELD

The present invention relates to systems and methods for cylinder air charge estimation used in controlling an internal combustion engine.

BACKGROUND ART

Precise air/fuel ratio control is an important factor in reducing feed gas emissions, increasing fuel economy, and improving driveability. Current internal combustion engine designs use various temperature, pressure, and flow sensors in an attempt to precisely control the amount of air and fuel, and thus the air/fuel ratio, for each cylinder firing event. However, due to various sensor limitations such as response time and being located away from the combustion chamber of the cylinder, it is difficult to precisely measure and coordinate or synchronize the air and fuel quantities which are actually combusted in the cylinder. Acceptable control strategies have been developed to compensate for various sensor limitations under steady-state operating conditions. Effort is now being focused on improving these strategies to provide more accurate air/fuel ratio control during transient as well as steady-state operating conditions.

Electronically controlled throttle valve actuators have been used to improve transient air/fuel ratio control by providing increased control authority over airflow. By eliminating the mechanical linkage between an accelerator pedal and the throttle valve, the engine controller can control throttle valve position to deliver the proper airflow for current driver demand and operating conditions.

Airflow is typically measured using a mass airflow (MAF) sensor positioned upstream of the throttle valve. Intake air travels past the MAF sensor, through the throttle valve and into the intake manifold where it is distributed to a bank of cylinders. Intake air enters a cylinder upon the opening of one or more intake valves. Fuel may be mixed with the intake air prior to entering the cylinder or within the cylinder for direct injection applications. The response characteristics of current MAF sensors coupled with the delay time associated with throttle valve positioning, transit time of the air mass between the MAF sensor and the cylinder, and response time of the fuel injector, make it difficult to accurately determine the precise quantity of air and fuel in the cylinder.

Various prior art approaches have attempted to improve air/fuel ratio control and compensate for one or more of the above factors. For example, one approach attempts to synchronize throttle valve positioning commands and fuel injection commands in the crank-angle domain so that throttle valve movement is prohibited after air flow measurement. Another approach delays throttle valve movement to allow time for the fuel system to react. One strategy which provides a future estimate of cylinder air charge linearly extrapolates a current airflow measurement for a future fuel injection event. However, this method assumes air charge changes at a constant rate and does not compensate for airflow sensor filtering effects which lead to an attenuated and delayed response.

SUMMARY OF THE INVENTION

It is an object of the present invention to improve air/fuel ratio control using adaptive and observer-based controls to provide an estimate for future cylinder air charge during a future fuel injection event.

In carrying out the above object and other objects, features, and advantages of the present invention, a system and method for controlling an internal combustion engine having an electronically controlled airflow actuator, such as a throttle valve or intake/exhaust valves, include predicting position of the airflow actuator using an actuator model corresponding to a subsequent injection of fuel into the cylinder and estimating air charge in the cylinder for the subsequent injection of fuel based on the predicted position of the airflow actuator. In one embodiment, an airflow model is used to determine a future intake airflow based on the future position determined by the actuator model. A manifold filling model may then be used to provide the estimate for the future cylinder air charge with an appropriate amount of fuel scheduled to deliver a desired air/fuel ratio within the cylinder. The models, their associated parameters, and/or output values may be modified using measured values for mass airflow and throttle valve position.

The present invention includes a number of advantages relative to prior art approaches. For example, the present invention compensates for inherent sensor dynamics to produce air charge estimates based on actual airflow actuator position and/or motion. The present invention uses existing sensors to improve stability and prediction accuracy for both airflow actuator position and the resulting airflow. The present invention uses adaptation and learning to adjust model parameters and/or outputs and compensates for modeling inaccuracies. The improved air/fuel ratio control based on more accurate in-cylinder air charge determination may result in reductions in the size of catalyst which would otherwise be necessary to accommodate excursions from stoichiometry induced by transient control inaccuracies.

The above advantages and other advantages, objects, and features of the present invention, will be readily apparent from the following detailed description of the best mode for carrying out the invention when taken in connection with the accompanying drawings.

BEST MODE(S) FOR CARRYING OUT THE INVENTION

Figure 1:
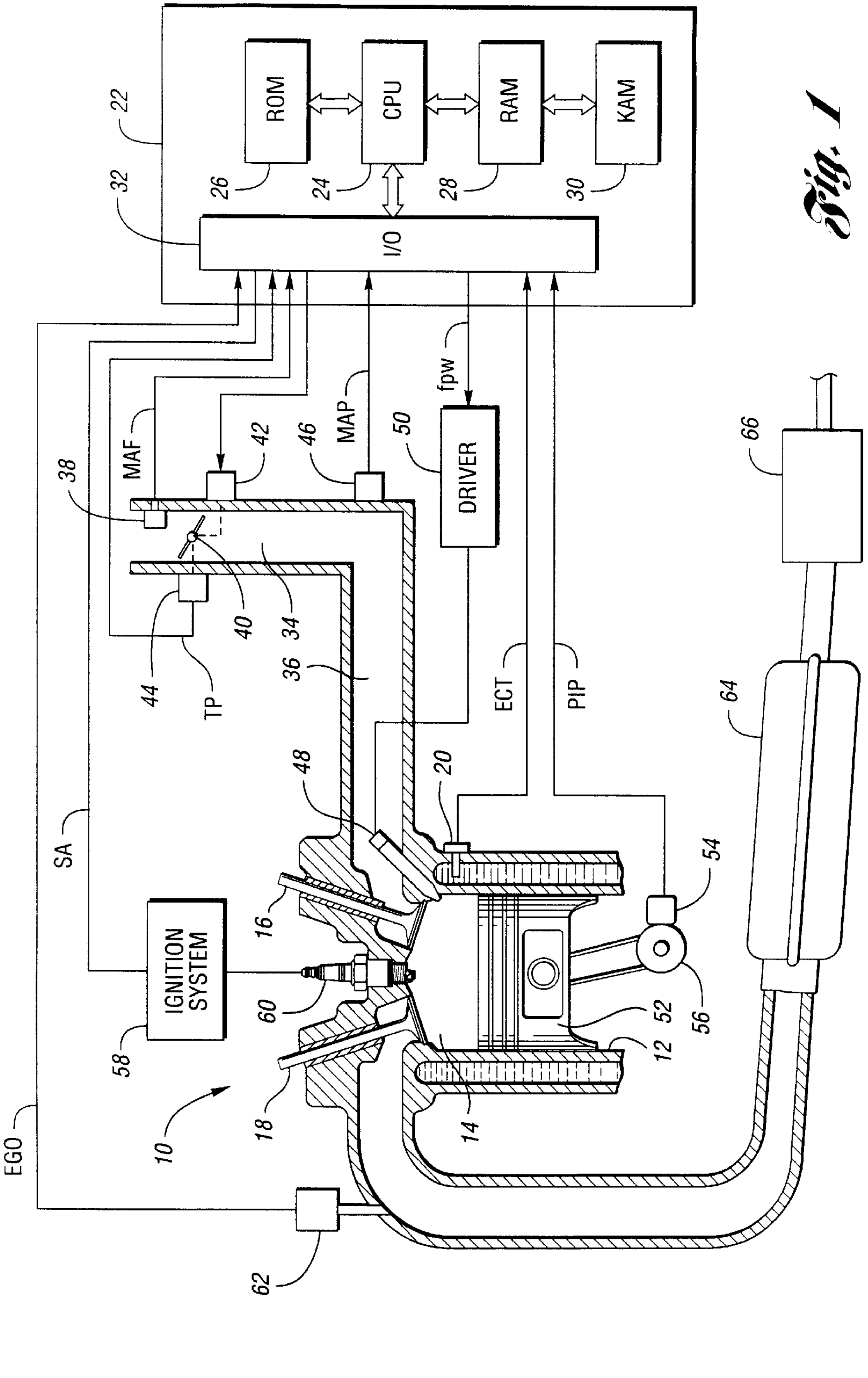
FIG. 1 is a block diagram illustrating one embodiment of an engine control system using cylinder air charge estimation with observer-based and adaptive control according to the present invention.

A block diagram illustrating one embodiment of an engine control system for an internal combustion engine according to the present invention is shown in FIG. 1. While a direct injection application is depicted in FIG. 1, the present invention is equally applicable to conventional port or throttle body injection systems as well. Similarly, while the present invention is described primarily with reference to an electronically controlled throttle to provide airflow control, the present invention may also be applied to various other types of airflow actuators such as cylinder intake/exhaust valves used in variable cam timing and variable valve timing applications with appropriate adjustments to the various models.

System 10 is preferably an internal combustion engine having a plurality of cylinders, represented by cylinder 12, having corresponding combustion chambers 14. As one of ordinary skill in the art will appreciate, system 10 includes various sensors and actuators to effect control of the engine. One or more sensors or actuators may be provided for each cylinder 12, or a single sensor or actuator may be provided for the engine. For example, each cylinder 12 may include four actuators which operate the intake valves 16 and exhaust valves 18, while only including a single engine coolant temperature sensor 20.

In one embodiment, the present invention includes a mechanical variable cam timing device of conventional design used to alter the timing of intake valves 16 and/or exhaust valves 18 to provide airflow control. In an alternative embodiment, intake valves 16 and/or exhaust valves 18 are controlled by variable valve timing actuators, such as electromagnetic actuators, as known in the art. One preferred embodiment of the present invention uses an electronically controlled throttle for airflow control as described in detail below.

System 10 preferably includes a controller 22 having a microprocessor 24 in communication with various computer-readable storage media. The computer readable storage media preferably include a read-only memory (ROM) 26, a random-access memory (RAM) 28, and a keep-alive memory (KAM) 30. The computer-readable storage media may be implemented using any of a number of known memory devices such as PROMs, EPROMs, EEPROMs, flash memory, or any other electric, magnetic, optical, or combination memory device capable of storing data, some of which represents executable instructions, used by microprocessor 24 in controlling the engine. Microprocessor 24 communicates with the various sensors and actuators via an input/output (I/O) interface 32.

In operation, air passes through intake 34 where it may be distributed to the plurality of cylinders via an intake manifold, indicated generally by reference numeral 36. System 10 preferably includes a mass airflow sensor 38 which provides a corresponding signal (MAF) to controller 22 indicative of the mass airflow. In preferred embodiments of the present invention, a throttle valve 40 is used to modulate the airflow through intake 34 during certain operating modes. Throttle valve 40 is preferably electronically controlled by an appropriate actuator 42 based on a corresponding throttle position signal generated by controller 22. A throttle position sensor 44 provides a feedback signal (TP) indicative of the actual position of throttle valve 40 to controller 22 to implement closed loop control of throttle valve 40.

As will be appreciated by those of ordinary skill in the art, the present invention may also be used in unthrottled or throttleless engines where airflow may be controlled using appropriate valve timing. Whether or not the engine includes a physical throttle, such as throttle valve 40, the engine may be operated in various unthrottled modes. Such operation reduces pumping losses and increases engine efficiency which may result in improved fuel economy. Throttleless engines may include those having variable valve timing (VVT) where intake and exhaust valves are controlled electronically using electromagnetic actuators rather than a conventional cam arrangement. Likewise, engines having variable cam timing mechanisms may be operated at wide open throttle to reduce pumping losses with air flow control provided by modifying the cam timing. The present invention is also applicable to engine configurations with conventional valve timing mechanisms which may also operate at wide open throttle in various modes depending upon the current driver demand and engine operating conditions.

As illustrated in FIG. 1, a manifold absolute pressure sensor 46 may be used to provide a signal (MAP) indicative of the manifold pressure to controller 22. Air passing through intake manifold 36 enters combustion chamber 14 through appropriate control of one or more intake valves 16. As described above, intake valves 16 and exhaust valves 18 may be controlled directly or indirectly by controller 22 for variable valve timing or variable cam timing applications, respectively. Alternatively, intake valves 16 and exhaust valves 18 may be controlled using a conventional camshaft arrangement. A fuel injector 48 injects an appropriate quantity of fuel in one or more injection events for the current operating mode based on a signal (FPW) generated by controller 22 and processed by driver 50.

As illustrated in FIG. 1, fuel injector 48 injects an appropriate quantity of fuel in one or more injections directly or indirectly into combustion chamber 14. Control of the fuel injection events is generally based on the position of piston 52 within cylinder 12. Position information is acquired by an appropriate sensor 54 which provides a position signal (PIP) indicative of rotational position of crankshaft 56.

According to the present invention, the air/fuel ratio may be more precisely controlled by providing an estimate of cylinder air charge for a future injection event. Once an appropriate air/fuel ratio is determined based on a desired engine torque and current operating conditions, an appropriate quantity of fuel is determined based on the estimated cylinder air charge to more accurately control the air/fuel ratio. Preferably, the cylinder air charge and fuel are determined for two PIP events ahead of the current event. Because the PIP events are based on crank angle, timing between events will vary based on the rotational speed (RPM) of the engine. Preferably, one or more airflow actuators are controlled to synchronize the predicted or estimated cylinder air charge with the scheduled fuel injection event. In throttled applications, air flow may be controlled using the throttle valve in combination with control of valve timing for intake and/or exhaust valves.

The desired fuel flow is achieved by appropriate signals generated by controller 22 for fuel injectors 48 to inject an appropriate quantity of fuel in one or more injections directly or indirectly into each combustion chamber 14. Depending upon the particular application, fuel quantity may also be determined or adjusted to account for fuel film or wall wetting which ultimately affects the amount of fuel actually delivered to the cylinder. At the appropriate time during the combustion cycle, controller 22 generates a spark signal (SA) which is processed by ignition system 58 to control spark plug 60 and initiate combustion within chamber 14. Preferably, spark is maintained at MBT, i.e., the timing that produces maximum torque for a given amount of air and fuel, whenever possible because these conditions generally result in better fuel economy.

Controller 22 (or a conventional camshaft arrangement) controls one or more exhaust valves 18 to exhaust the combusted air/fuel mixture through an exhaust manifold. An exhaust gas oxygen sensor 62 provides a signal (EGO) indicative of the oxygen content of the exhaust gases to controller 22. This signal may be used to adjust the desired air/fuel ratio, or control the operating mode of one or more cylinders. The exhaust gas is passed through the exhaust manifold and through a catalytic converter 64 and in some applications a $NO_x$ trap 66 before being exhausted to atmosphere.

Figure 2:
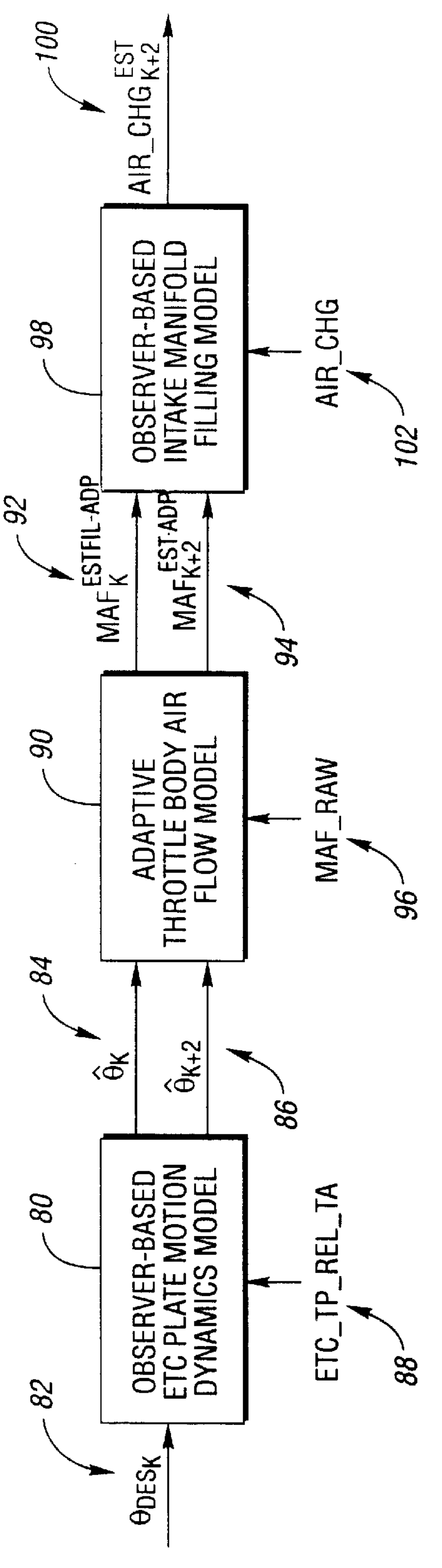
FIG. 2 is a simplified block diagram illustrating operation of a system or method for controlling an engine according to the present invention.

FIG. 2 provides a simplified block diagram illustrating operation of a system or method for future in-cylinder air charge estimation according to the present invention. A dynamic model 80 of a closed-loop airflow actuator system is used recursively to generate estimates for current and future actuator positions. In this example, model 80 processes a current desired throttle angle 82 using an observer-based electronic throttle control (ETC) plate motion dynamics model 80 to generate a current estimate 84 of throttle angle position and a future estimate 86 of throttle angle position. In a preferred embodiment, future throttle angle position 86 corresponds to a two-PIP ahead event which corresponds to a subsequent fuel injection based on crank angle position. Observer-based model 80 uses a current measured throttle angle position 88 to ensure stability and compensate for any modeling inaccuracies as described in greater detail below.

The current 84 and future 86 airflow actuator position estimates are processed by an adaptive throttle body airflow model 90 to generate current 92 and future 94 estimates for mass airflow (MAF). Airflow model 90 is an adaptive model which accounts for sensor dynamics and filtering effects to provide current and future airflow estimation. A measured or sensed mass airflow signal 96 is used as feedback for adaptation.

The current 92 and future 94 mass airflow estimates are provided to an observer-based intake manifold filling model 98 which then provides an estimate of the cylinder air charge 100 for a future fuel injection event. Manifold filing model 98 uses a current calculated air charge 102 as a feedback element to account for modeling inaccuracies. The current calculated air charge 102 is based on the measured or sensed mass airflow 96, which is also processed by manifold filling model 98, in addition to the current estimate 92 and future estimate 94 for mass airflow generated by the adaptive throttle body airflow model 90.

Figure 3:
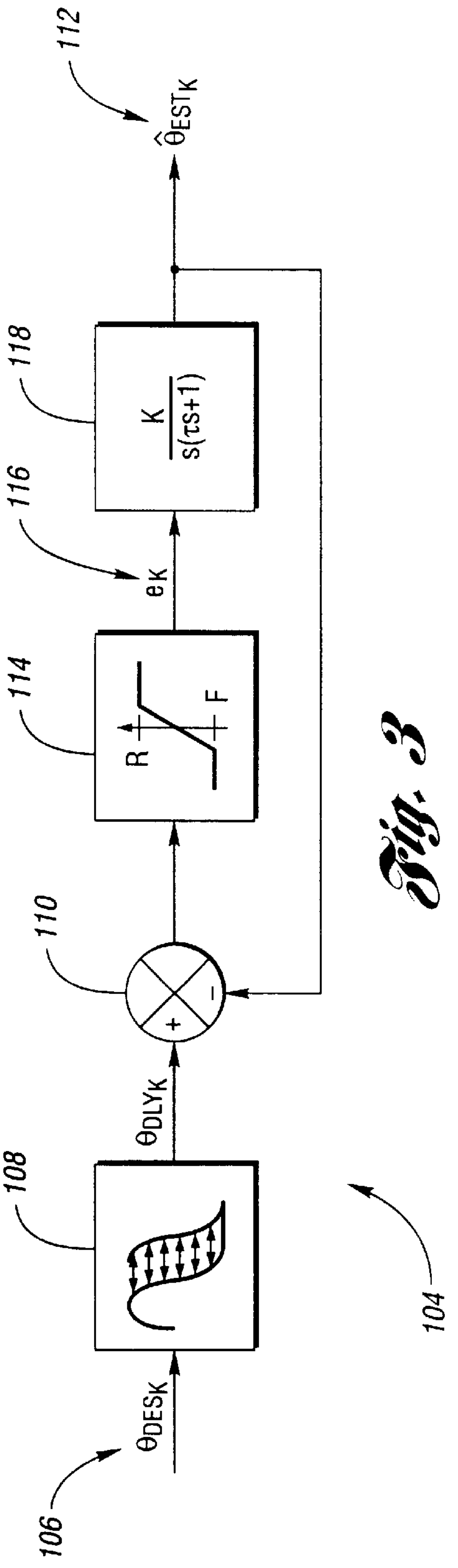
FIG. 3 is a block diagram illustrating a general dynamic model for a closed-loop electronic throttle control system for use in determining an estimated future cylinder air charge according to the present invention.

FIG. 3 is a block diagram illustrating a general dynamic model for a closed-loop ETC system for use in determining an estimated future cylinder air charge according to the present invention. Dynamic model 104 captures the dynamics of the system, i.e., the transfer function, so that a throttle angle output 112 can be predicted or estimated based on a given desired throttle angle input 106. Model 104 combines a closed-loop throttle controller and plant dynamics model. Input 106 is preferably the commanded or desired throttle angle while output 112 represents the actual throttle angle after the controller has responded. In one preferred embodiment of the present invention, the commanded or desired throttle angle 106 is generated or sampled at a predetermined time interval which is independent of the current engine rotational speed (RPM). Model 104 is non-linear and contains a transport delay 108 to model the controller delay associated with the commanded throttle angle. The estimated throttle angle is used to provide a feedback signal which is combined at block 110 with the delayed commanded throttle angle to provide an error or correction term. To model the motor rate-limiting effects and bias spring, a non-linear saturation element 114 with positive and negative calibratible limits R and F, respectively, is also provided and results in a rate-limited error 116. A second-order linear portion of the model 118 represents plant dynamics. Two calibratable parameters (K and $\tau$) of linear portion 118 are functions of both the throttle controller and motor dynamics. Depending upon the particular controller gains selected and motor dynamics used, the linear portion 118 of model 104 can be further simplified as an integrator with a proportional gain. According to the present invention, model 104 is used in a recursive manner to provide current and future throttle angle estimates based on an input desired throttle angle. To provide an appropriate estimator, model 104 is discretized to provide a difference equation and algorithm for estimating the current and future throttle angle positions.

Preferably, model 104 is discretized in the crank-angle domain because air charge calculation and intake manifold filling dynamics are executed on a crank-angle domain basis. As such, the sampling interval in the resulting algorithm becomes a function of engine speed. The presence of both linear and non-linear components in model 104 requires discretizing the model in four steps: discretizing the non-linear transport delay, discretizing the non-linear rate-limiter, discretizing the linear feed-forward frequency-domain plant dynamics model, and developing an algorithm which combines all of the components of the model. The algorithm is preferably used recursively to provide one-PIP and two-PIP ahead throttle angle estimates. A closed-loop observer structure is then used for the current throttle angle estimate and one-PIP ahead throttle angle estimate to account for modeling inaccuracies and improve steady-state stability.

The first step in discretizing the model includes discretizing the transport delay 108 to support a variable sampling interval. When a desired throttle angle 106 is commanded, controller actuation does not take place until some later time. In one embodiment, the transport delay is approximately 14 milliseconds. In a discrete domain, the controller actuation delay is represented by $K_{dly}$ measurement samples. Mathematically this can be represented by:

$\theta_{DLY}(t)=\theta_{DES}(t-t_{DLY})$ $\theta_{DLY}(k)=\theta_{DES}(k-k_{DLY})$ where: $k_{DLY}=t_{DLY}/T$, T is the sample period given by:

$$T=\frac{2}{\frac{n}{60}(N_{CYL})}$$

Since $k_{DLY}$ varies:

$$\theta_{DLY}(k)=\alpha[\theta_{DES}(k-\mathrm{ceil}(k_{DLY}))]+\beta[\theta_{DES}(k-\mathrm{ceil}(k_{DLY}-1))]$$

where:

$$\alpha=(k_{DLY}-\mathrm{ceil}(k_{DLY}-1)),\ \text{and}\ \beta=1-\alpha$$

The use of a ceiling function (ceil(x)) ensures an actual delayed sample is used.

For a fixed sampling interval, $K_{dly}$ is a fixed quantity. However, since the algorithm is to be executed in the crank-angle domain with a variable sampling interval based on engine speed, $K_{dly}$ is no longer a fixed quantity. Therefore, a weighted function of delayed samples of the desired throttle angle is required to account for a varying sampling interval. According to the present invention, ranges of both the sampling interval and $K_{dly}$ must be identified so that a minimum history of delayed desired throttle angle samples is used in the algorithm. For an eight-cylinder engine with engine speeds ranging between 650 and 7000 RPM, ranges of the sampling interval and $K_{dly}$ are:

$$2.1\ \text{ms}\leqq T\leqq 23.1\ \text{ms}$$

and $$6.667\geqq k_{DLY}\geqq 0.6087$$

With this range of $K_{dly}$, a weighted function of delayed samples of the desired throttle angle that ranges from the current desired throttle angle to a desired throttle angle seven samples old should be used. Therefore, a seven-sample history of the desired throttle angle is used to integrate the transport delay (14 ms in this example) into the algorithm. Of course, the number of samples maintained in the sample history will vary depending upon the particular application, but may be determined according to the process described above.

A second step in discretizing model 104 is to discretize the non-linear rate limiter used to model the throttle motor rate limiting effects and bias spring. Using a piecewise linear relationship after calculating the error term $e_K$, which is the error between the desired and actual throttle position, the rate limiter can be discretized as follows:

$$e_K=\theta_{DLY_K}-\hat{\theta}_{EST_K}$$

where:

$$e_K=f_{ratelimit}(e_K)=\begin{Bmatrix} R,\ \text{if}\ e_k>R \\ F,\ \text{if}\ e_K<F \\ e_K,\ \text{otherwise}\end{Bmatrix}$$

The above equations are also adaptable for use when an observer is added to model 104 as illustrated and described with reference to FIGS. 4 and 5. The representations for the non-linear rate-limiter for the current throttle angle and one-PIP ahead estimates are:

$$e_K=f_{ratelimit}(e_K)+L(\theta_{ACT_{K-1}}-\hat{\theta}_{EST_{K-1}})$$

$$e_{K-1}=f_{ratelimit}(e_{K+1})+L\ (\theta_{ACT_K}-\theta_{EST_K})$$

Preferably, the error is calculated after the current throttle angle is estimated.

The third step in discretizing the actuator model 104 is to discretize the feed-forward throttle control dynamics model 118. Because the model is linear, this can be accomplished using a Z-transform approach by applying any of a number of methods such as ZOH, Bilinear Transformation, Backward Euler, and the like. The Bilinear Transformation method, also known as Tustin's method, uses a trapezoidal rule for numerical integration approximation and provides a more accurate mapping of the plant dynamics in the discrete domain for an electronic throttle airflow actuator. Preferably, the Bilinear Transformation method is used because it is less sensitive to varying sampling intervals compared to other methods such as ZOH or Backward Euler methods which may introduce oscillatory and/or unstable behavior when large sampling intervals exist. The discrete domain transfer function G(z) for the frequency-domain plant dynamics model G(s) may be represented as follows:

$$G(s)=\frac{K}{s(\tau s+1)}$$

$$G(z)=G(s)\Big|_{s=\frac{2(z-1)}{T(z+1)}}=\frac{KT^2(z^2+2z+1)}{z^2(4\tau+2T)-8\tau z+(4\tau-2T)}=\frac{\hat{\theta}_{EST}(z)}{e(z)}$$

The discrete domain transfer function is then used to derive a corresponding difference equation for $F\leqq e_K\leqq R$ as follows:

$$\hat{\theta}_{EST_K}=\frac{1}{(1+b_0/a_0)}\left[\left(\frac{b_0}{a_0}\right)\theta_{DLY_K}+\left(\frac{b_1}{a_0}\right)e_{K-1}+\left(\frac{b_2}{a_0}\right)e_{K-2}-\left(\frac{a_1}{a_0}\right)\hat{\theta}_{EST_{K-1}}-\left(\frac{a_2}{a_0}\right)\hat{\theta}_{EST_{K-2}}\right]$$

where:

$$b_0=KT^2,b_1=2KT^2,b_2=b_0,a_0=(4\tau+2T),a_1=-8\tau,a_2=(4\tau-2T)$$

For $e_K>R$, the difference equation is:

$$\hat{\theta}_{EST_K}=\left[\left(\frac{b_0}{a_0}\right)R+\left(\frac{b_1}{a_0}\right)e_{K-1}+\left(\frac{b_2}{a_0}\right)e_{K-2}-\left(\frac{a_1}{a_0}\right)\hat{\theta}_{EST_{K-1}}-\left(\frac{a_2}{a_0}\right)\hat{\theta}_{EST_{K-2}}\right]$$

and for $e_K<F$, the difference equation is:

$$\hat{\theta}_{EST_K}=\left[\left(\frac{b_0}{a_0}\right)F+\left(\frac{b_1}{a_0}\right)e_{K-1}+\left(\frac{b_2}{a_0}\right)e_{K-2}-\left(\frac{a_1}{a_0}\right)\hat{\theta}_{EST_{K-1}}-\left(\frac{a_2}{a_0}\right)\hat{\theta}_{EST_{K-2}}\right]$$

The discretized components are then combined to form an algorithm for estimating the current throttle angle based on any desired throttle angle input.

Figure 4:
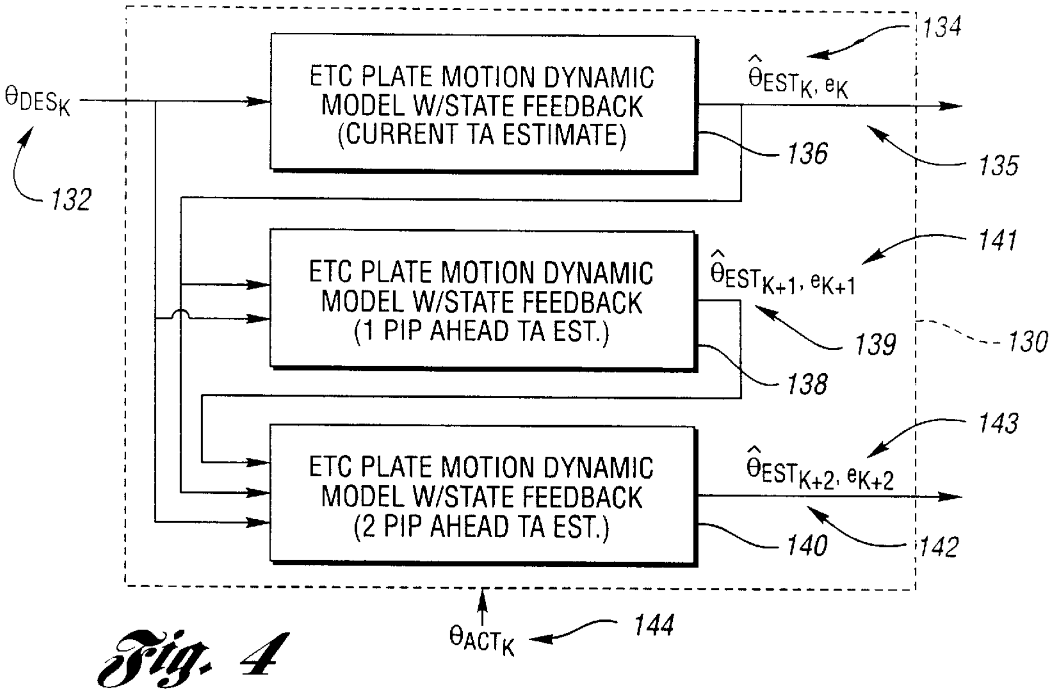
FIG. 4 is a simplified representation of a recursive airflow actuator position model for estimating current and first and second future actuator positions according to the present invention.
Figure 5:
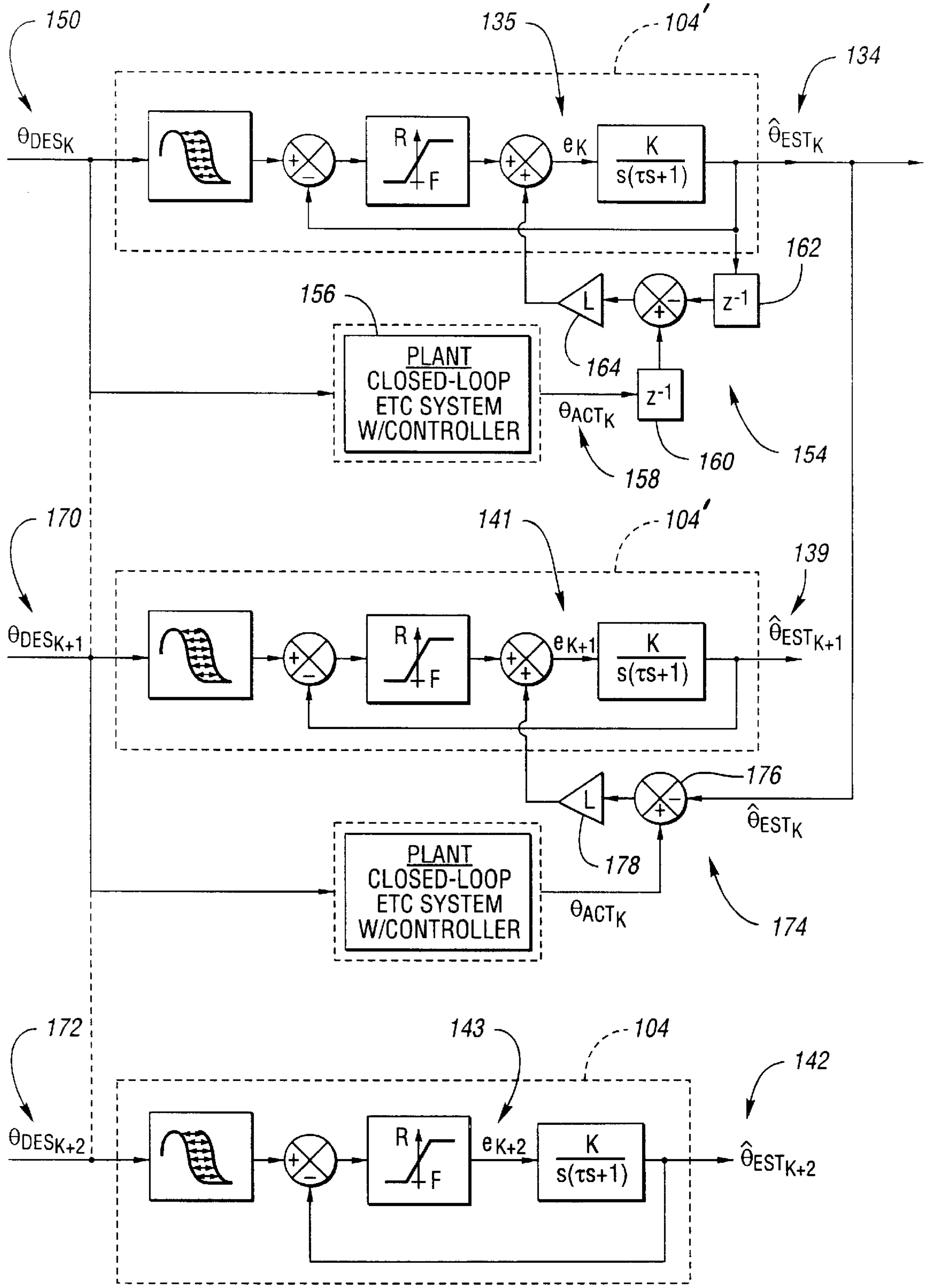
FIG. 5 is a more detailed representation of a model for estimating future airflow actuator position according to the present invention.

FIGS. 4 and 5 provide block diagrams illustrating a recursive airflow actuator position model with a closed-loop observer structure using sensed throttle plate position with a proportional gain to account for modeling inaccuracies and to ensure correct prediction of throttle plate position. FIG. 4 provides a simplified representation of the recursive airflow actuator position model for estimating current throttle valve position, and first and second future throttle valve positions according to the present invention. Recursive model 130 includes a desired throttle valve position 132 as an input. As described above, the desired or commanded throttle valve angle is sampled or provided on a predetermined (fixed) sampling interval. Relative to the crank-angle domain, the desired throttle valve position is considered to be constant for the current, and two future events. The desired throttle valve position 132 is used to provide an estimated current position 134 with an associated error 135 based on the ETC plate motion dynamic model 136. Outputs 134 and 135 are provided recursively to blocks 138 and 140. The current estimated throttle position 134 is used to predict a first future estimated throttle position 139 using block 138. An associated future error value 141 is also provided. As such, block 138 provides an estimated airflow actuator position for a first future engine event (fuel injection or intake event in this example) based on a current estimated position. The first future estimated position value is provided as an input to block 140 to generate a second future estimated position value 142 and associated error 143. In one preferred embodiment, the second future estimated value 142 is determined for a two-PIP ahead throttle angle estimate. A measured value 144 corresponding to the current throttle valve position provides feedback to model 130 to account for modeling inaccuracies and ensure correct prediction of future throttle plate positions as best illustrated in FIG. 5.

A more detailed representation of a recursive observer-based model for estimating future airflow actuator position according to the present invention is illustrated in FIG. 5. A closed-loop observer structure 154 is added to the dynamic throttle position model 104' using a measured or sensed throttle position 158 provided by the closed-loop ETC system controller 156 as a feedback signal. The measured signal is time shifted as represented by block 160 and compared with the current estimate 134, which is time shifted as represented by block 162, to generate an error or difference signal. A proportional gain 164 is applied and used to adjust or modify model 104 based on an error or correction factor 135.

The desired throttle valve position for a first future event 170 is provided as an input to another instance of model 104' to predict a first future estimated position 139. As illustrated by the broken line, the future desired value may be assumed to be equal to the current desired value 150 and the second future desired value 172 for most applications. Input 170 is processed by model 104' to determine a first future estimated value for throttle position 139. The current estimated value 134 is used by an observer structure 174 to account for modeling errors and provide a feedback signal based on the current actual throttle valve position at block 176. A proportional gain 178 is applied and the error 141 is added to the model 104'.

Similarly, a desired throttle valve position for a second future event 172 is processed by model 104 to determine an estimated throttle angle position for a second future event 142 with an associated feedback error 143.

The closed-loop observer structures 154 and 174 of FIG. 5 are used only for the current and first future estimate for throttle angle position and not for the second future estimate. To use a closed-loop observer structure for the second future event would require a sensed throttle position for the first future event which is not available. However, the feedback provided for the current and first future estimates is dynamically coupled with the second future estimate. As such, the second future estimate will be improved as a result of integrating (combining) a closed-loop observer with the current and first future estimates.

In one embodiment, the present invention executes a recursive algorithm assuming that the desired throttle angle is the same for the current, first future event, and second future event. This assumption is valid so long as the intake events occur at a faster rate than the update rate of the desired throttle angle. In situations where this assumption is not valid, the closed-loop observer structure illustrated in FIGS. 4 and 5 will make appropriate corrections. One implementation for a recursive algorithm according to the present invention is as follows:

$$\hat{\theta}_{EST_K}=\frac{1}{(1+b_0/a_0)}\left[\left(\frac{b_0}{a_0}\right)\theta_{DLY_K}+\left(\frac{b_1}{a_0}\right)e_{K-1}+\left(\frac{b_2}{a_0}\right)e_{K-2}-\left(\frac{a_1}{a_0}\right)\hat{\theta}_{EST_{K-1}}-\left(\frac{a_2}{a_0}\right)\hat{\theta}_{EST_{K-2}}\right]$$

For $e_K > R$, $$\hat{\theta}_{EST_K}=\left[\left(\frac{b_0}{a_0}\right)R+\left(\frac{b_1}{a_0}\right)e_{K-1}+\left(\frac{b_2}{a_0}\right)e_{K-2}-\left(\frac{a_1}{a_0}\right)\hat{\theta}_{EST_{K-1}}-\left(\frac{a_2}{a_0}\right)\hat{\theta}_{EST_{K-2}}\right]$$

and for $e_K < F$, $$\hat{\theta}_{EST_K}=\left[\left(\frac{b_0}{a_0}\right)F+\left(\frac{b_1}{a_0}\right)e_{K-1}+\left(\frac{b_2}{a_0}\right)e_{K-2}-\left(\frac{a_1}{a_0}\right)\hat{\theta}_{EST_{K-1}}-\left(\frac{a_2}{a_0}\right)\hat{\theta}_{EST_{K-2}}\right]$$

where $$e_k=f_{ratelimit}(\theta^{DLY_K}-\hat{\theta}_{EST_K})+L(\theta_{ACT_{K-1}}-\hat{\theta}_{EST_{K-1})}$$

For the first and second future position values assuming constant desired values and constant delay values (equal to the current desired value and current delay value), the first future position value is given by:

$$\hat{\theta}_{EST_{K+1}}=\frac{1}{(1+b_0/a_0)}\left[\left(\frac{b_0}{a_0}\right)\theta_{DLY_{K+1}}+\left(\frac{b_1}{a_0}\right)e_{K}+\left(\frac{b_2}{a_0}\right)e_{K-1}-\left(\frac{a_1}{a_0}\right)\hat{\theta}_{EST_{K}}-\left(\frac{a_2}{a_0}\right)\hat{\theta}_{EST_{K-1}}\right]$$

For $e_{K+1} > R$, $$\hat{\theta}_{EST_{K+1}}=\left[\left(\frac{b_0}{a_0}\right)R+\left(\frac{b_1}{a_0}\right)e_{K}+\left(\frac{b_2}{a_0}\right)e_{K-1}-\left(\frac{a_1}{a_0}\right)\hat{\theta}_{EST_{K}}-1\left(\frac{a_2}{a_0}\right)\hat{\theta}_{EST_{K-1}}\right]$$

and for $e_{K+1} < F$, $$\hat{\theta}_{EST_{K+1}}=\left[\left(\frac{b_0}{a_0}\right)F+\left(\frac{b_1}{a_0}\right)e_{K}+\left(\frac{b_2}{a_0}\right)e_{K-1}-\left(\frac{a_1}{a_0}\right)\hat{\theta}_{EST_{K}}-\left(\frac{a_2}{a_0}\right)\hat{\theta}_{EST_{K-1}}\right]$$

where $$e_{K+1}=f_{ratelimit}(\theta_{DLY_{K+1}}-\hat{\theta}_{EST\ K+1})+L(\theta_{ACT_K}-\hat{\theta}_{EST_{K})}$$

For the second future position value of the throttle valve, $$\hat{\theta}_{EST_{K+2}}=\frac{1}{(1+b_0/a_0)}\left[\left(\frac{b_0}{a_0}\right)\theta_{DLY_{K+2}}+\left(\frac{b_1}{a_0}\right)e_{K+1}+\left(\frac{b_2}{a_0}\right)e_{K}-\left(\frac{a_1}{a_0}\right)\hat{\theta}_{EST_{K+1}}-\left(\frac{a_2}{a_0}\right)\hat{\theta}_{EST_{K}}\right]$$

For $e_{K+2} > R$, $$\hat{\theta}_{EST_{K+2}}=\left[\left(\frac{b_0}{a_0}\right)R+\left(\frac{b_1}{a_0}\right)e_{K+1}+\left(\frac{b_2}{a_0}\right)e_{K}-\left(\frac{a_1}{a_0}\right)\hat{\theta}_{EST_{K+1}}-\left(\frac{a_2}{a_0}\right)\hat{\theta}_{EST_{K}}\right]$$

and for $e_{K+2} < F$,

-continued $$\hat{\theta}_{EST_{K+2}} = \left[\left(\frac{b_0}{a_0}\right)F + \left(\frac{b_1}{a_0}\right)e_{K+1} + \left(\frac{b_2}{a_0}\right)e_K - \left(\frac{a_1}{a_0}\right)\hat{\theta}_{EST_{K+1}} - \left(\frac{a_2}{a_0}\right)\hat{\theta}_{EST_K}\right]$$

where $$e_{K+2} = f_{ratelimit}(\theta_{DLY_{K+2}} - \hat{\theta}_{EST_{K+2}})$$

Figure 6:
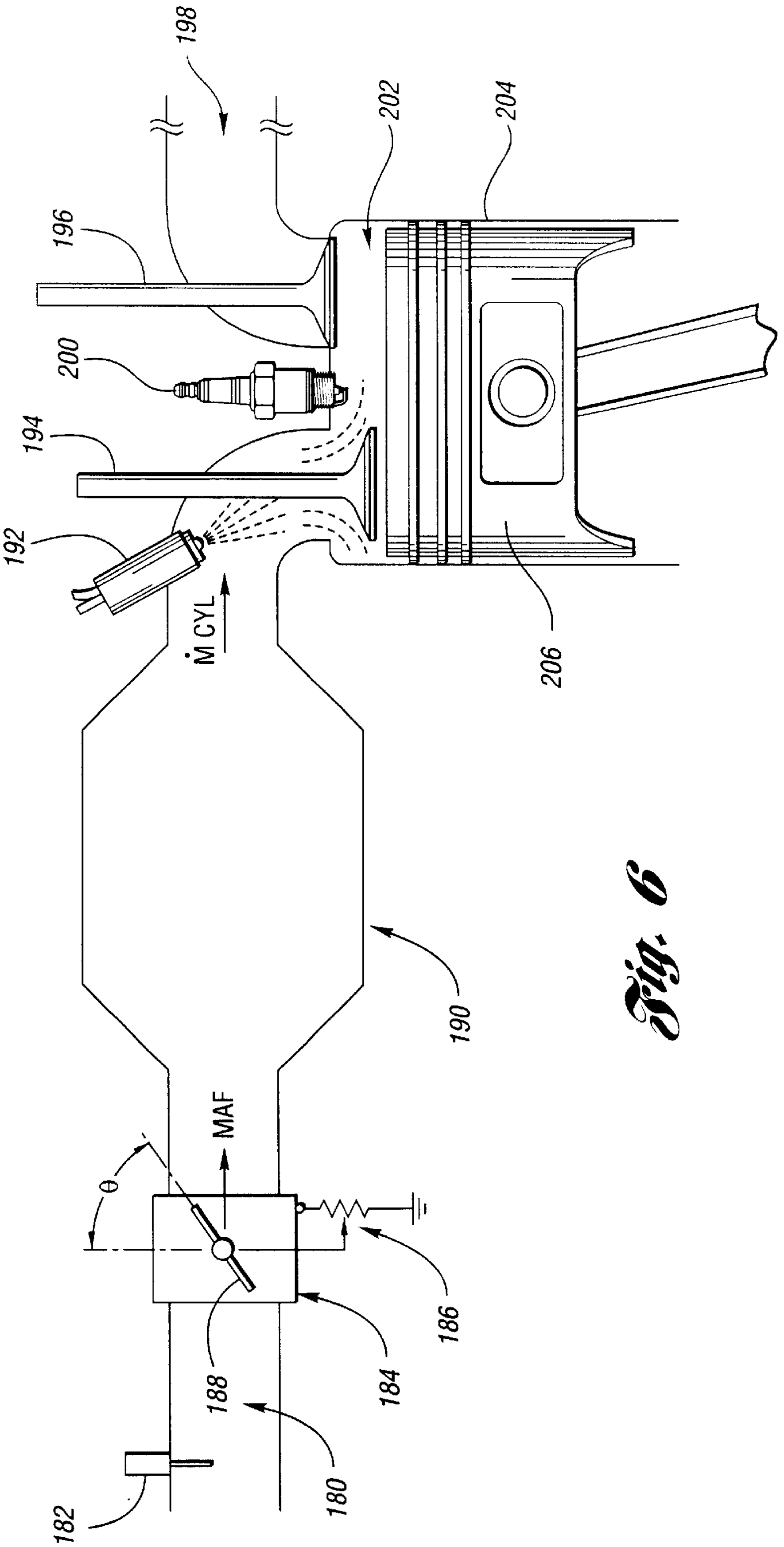
FIG. 6 is a block diagram illustrating estimation of intake airflow and manifold filling based on estimated throttle plate angle according to one embodiment of the present invention.

FIG. 6 is a block diagram illustrating estimation of intake airflow and manifold filling effects based on estimated throttle plate angle according to one embodiment of the present invention. Once the current and future throttle plate angles are estimated as described above, the present invention utilizes an adaptive airflow model based on the actuator positions in conjunction with an intake manifold filling model to predict the in-cylinder air charge for a future injection event. Depending upon the particular engine technology and airflow actuator, the intake manifold filling model may be modified or eliminated. For example, for applications using variable valve timing with a throttle-less engine, the actuator position model and/or airflow model may incorporate the manifold filling effects. Likewise, any two or more of the models may be combined with appropriate modifications without departing from the spirit or scope of the present invention.

In one preferred embodiment, an electronically controlled throttle valve is used alone or in conjunction with controllable valve timing to provide airflow control. As such, the current and future estimated throttle plate angles are used in an adaptive throttle body airflow model to provide corresponding current and future estimates of mass airflow into the intake manifold 190. An adaptive strategy using a measured or sensed mass airflow, such as provided by a mass airflow (MAF) sensor 182, has a feedback signal to account for modeling inaccuracies and sensor dynamics. MAF sensor dynamics typically provide an attenuated and delayed signal relative to the actual mass airflow.

An unadapted throttle body mass airflow model may be based on the following adiabatic orifice flow equations:

$$MAF = C_D A_{th} p_{atm} \sqrt{\frac{2\kappa}{\kappa - 1}\left[\left(\frac{p_{man}}{p_{atm}}\right)^{\frac{2}{\kappa}} - \left(\frac{p_{man}}{p_{atm}}\right)^{\frac{k+1}{\kappa}}\right]\frac{M}{\overline{R}T}}$$

for $$\frac{p_{man}}{p_{atm}} > \left(\frac{2}{\kappa + 1}\right)^{\frac{K}{K-1}}$$

and $$MAF = C_D A_{th} p_{atm} \sqrt{\kappa\left[\left(\frac{2}{\kappa + 1}\right)^{\frac{k+1}{K-1}}\right]\frac{M}{\overline{R}T}}$$

for $$\frac{p_{man}}{p_{atm}} \le \left(\frac{2}{\kappa + 1}\right)^{\frac{\kappa}{K-1}}$$

where $C_D$ represents discharge coefficient (determined empirically), $A_{th}$ represents effective throttle flow area, $\rho_{atm}$ represents atmospheric pressure, $\rho_{man}$ represents downstream intake manifold pressure, K represents ratio of specific heats, M represents molecular weight of gas, T represents upstream temperature of air charge, $\overline{R}$ represents ideal gas constant, and MAF represents mass airflow entering the throttle body.

These equations are highly non-linear and are preferably regressed from empirical mapping data based on a particular size of throttle body or throttle plate. Preferably, the mass airflow model includes inputs corresponding to current barometric (atmospheric) pressure (BP), air charge temperature (ACT), intake manifold pressure (MAP), and throttle angle. For the first and second future mass airflow estimates, the intake manifold pressure and air charge temperature are assumed to be the same as the current values. In one preferred embodiment, intake manifold pressure corresponds to a desired manifold pressure commanded by the electronic throttle controller rather than an actual measured or sensed value. These assumptions are valid for air charge estimation purposes with any inaccuracies compensated by the adaptive parameters described in greater detail below.

With reference to FIG. 6, air is inducted through intake 180 and passes by mass airflow sensor 182 before entering throttle body 184. Intake air is modulated by position of throttle plate 188 with a measured or sensed position determined by throttle plate position sensor 186. Air passing through throttle body 184 enters intake manifold 190 where it is distributed to the various cylinders 204. Fuel injector 192 injects an appropriate quantity of fuel which is entrained as the air passes into cylinder 204 upon the opening of intake valve (or valves) 194. Intake valve 194 is closed as piston 206 rises during the compression stroke. An appropriate signal is provided to spark plug 200 for combustion to occur within chamber 202. Exhaust valve (or valves) 196 is then opened and the combusted gases pass into exhaust manifold 198. According to the present invention, air/fuel ratio control is improved by estimating position of throttle plate 188 to determine airflow into intake manifold 190. Any modeling and/or sensor dynamics are compensated for using feedback provided by mass airflow sensor 182 and throttle position sensor 186. A manifold filling model is used to provide an estimate of the air charge entering combustion chamber 202 from manifold 190 during the subsequent intake event when intake valve 194 is open and an air/fuel mixture is provided to chamber 202.

Figure 7:
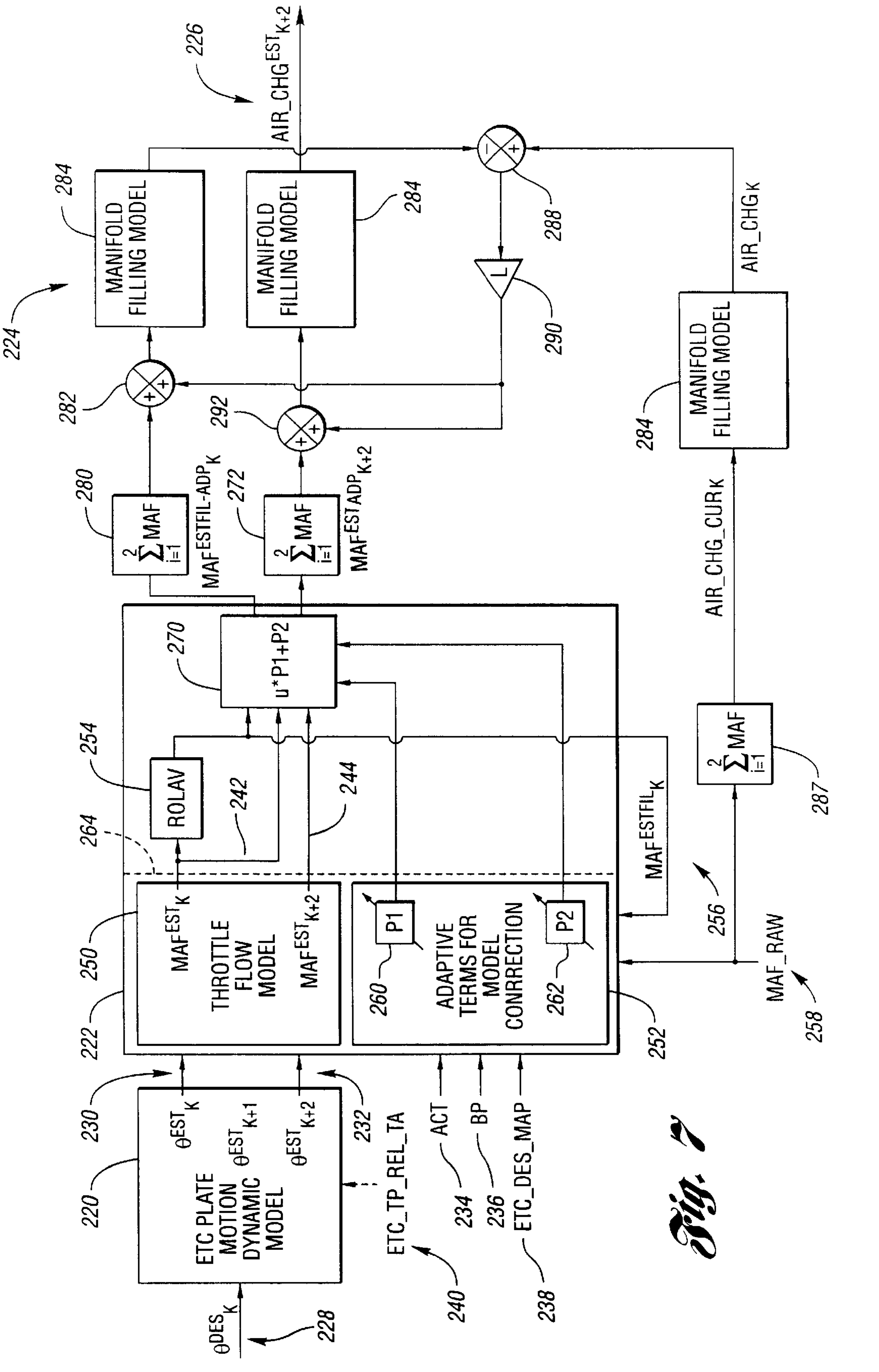
FIG. 7 is a block diagram illustrating a control system integrating adaptive and observer-based controls for future in-cylinder air charge estimation according to the present invention.

A block diagram illustrating a control system integrating adaptive and observer-based controls for future in-cylinder air charge estimation according to the present invention is shown in Figure 7. The ETC plate motion dynamic model 220 is used in conjunction with an airflow model 222 and manifold filling model 224 to estimate or predict the in-cylinder air charge 226 for a future intake or fuel injection event. A desired throttle angle 228 is used to generate a current estimate 230 and a future estimate 232 of the throttle plate position. Throttle flow model 222 uses the current and estimated throttle valve positions 230 and 234, respectively, along with air charge temperature 234, barometric pressure 236, and desired (or sensed or estimated) intake manifold pressure 238 to generate estimates for the current mass airflow (MAF) 242 and a future mass airflow 244 which are modified or corrected by adaptive terms $p_1$ 260 and $P_2$ 262 at block 270.

As illustrated in FIG. 7, the adaptive terms 252 may be used to modify the output of the throttle flow model 222 rather than directly modifying the model parameters. This approach is particularly useful when a regressive model is used rather than an analytical model because modification of the regressive model would be significantly more computationally intensive. Broken line 264 is used to indicate that the corrective or adaptive parameters may be also used to modify the base model 222 without departing from the spirit or scope of the present invention. For example, when using a transfer function or analytical model rather than an empirically determined regressive model, the model parameters may be adjusted directly based on the feedback using one or more measured values.

The current MAF estimate is filtered by a filter 254 to compensate for sensor dynamics before adaptation and provided as feedback 256 to model 222 along with a measured or sensed MAF signal 258. After correction by block 270, the current and future estimated MAF outputs are integrated as represented by blocks 280 and 272, respectively. These values are then corrected with appropriate feedback as represented by block 282 and 292, respectively. The resulting corrected values are provided to a manifold filling model 284 to produce a future estimated air charge 226. A current estimated air charge is also provided to block 288 where it is compared to a current air charge calculated based on the sensed or measured MAF 258, after being integrated at block 287, and processed by the same manifold filling model 284. A proportional gain 290 is applied to the resulting error or difference which is then used by blocks 282 and 292 to correct the current and future estimated intake air charge values, respectively.

To account for modeling inaccuracies (which include combined inaccuracies of the ETC dynamics and throttle airflow models) and compensate for MAF sensor dynamics, an adaptive algorithm which uses a sensed MAF 258. The MAF sensor value provides feedback to model 222 and model 224 for the current estimated throttle airflow and cylinder air charge. Flow model adaptation is used after assumed MAF sensor dynamics are applied to the current estimate as represented by filter 254. In one embodiment, the MAF sensor dynamics are represented by a first order filter with an identified time constant of about 22 milliseconds. As described above, because the flow model may be based on regression data rather than an analytic function, adapting dynamic parameters relating to the mass airflow is computationally intensive. As such, depending upon the particular application, the adaptive terms are used to adapt the filtered current MAF estimate at block 270 to the sensed MAF. Mathematically, this may be represented as:

$$MAF_{ESTFIL_K}(P_1)+P_2=MAF_{RAW_K}$$

where $MAF_{ESTFIL}$ represents the current MAF estimate with sensor dynamics applied, $MAF_{RAW}$ represents sensed MAF, $P_1$ represents a multiplicative adaptive parameter, and $P_2$ represents an additive adaptive parameter. A linear least squares estimation method may be used with the solution formulated as:

$$\Phi_{(m\times 2)}\Theta_{(2\times 1)}=Y_{(m\times 1)}$$

with expanded matrices:

$$\begin{bmatrix} MAF_{ESTFIL_K} & 1 \\ MAF_{ESTFIL_{K-1}} & 1 \\ \cdots & \\ MAF_{ESTFIL_{K-m}} & 1 \end{bmatrix} \begin{bmatrix} P_1 \\ P_2 \end{bmatrix} = \begin{bmatrix} MAF_{RAW_K} \\ MAF_{RAW_{K-1}} \\ \cdots \\ MAF_{RAW_{K-m}} \end{bmatrix}$$

where $$\phi_K^T = [\,MAF_{ESTFIL_K} \quad 1\,]$$

For on-line adaptive control, a Recursive Least Squares Estimation method may be used with the general form:

$$\Theta_K=\Theta_{K-1}+K_K(Y_K-\Phi_K^{T}*\Theta_{K-1})$$

where $$K_K=(\Phi_K^{T}\Phi_K)^{-1}*\phi_K$$

However, the calculation for $K_K$ is computationally intensive and may be resource prohibitive in terms of memory and processing time for a normal linear least squares solution. As such, Kaczmarz's Projection Algorithm is preferably used according to:

$$K_K = \begin{bmatrix} K_{1_K} \\ K_{2_K} \end{bmatrix} = \frac{\gamma * \phi_K}{\alpha + (\phi_K^T \phi_K)},\ 0 < \gamma < 2,\ \alpha \geq 0$$

$$\Theta_K = \begin{bmatrix} P_{1_K} \\ P_{2_K} \end{bmatrix} = \begin{bmatrix} P_{1_{K-1}} \\ P_{2_{K-1}} \end{bmatrix} + \begin{bmatrix} K_{1_K} \\ K_{2_K} \end{bmatrix} \left( \begin{bmatrix} MAF_{RAW_K} \\ MAF_{RAW_K} \end{bmatrix} - [\,MAF_{ESTFIL_K} \quad 1\,] \begin{bmatrix} P_{1_{K-1}} \\ P_{2_{K-1}} \end{bmatrix} \right)$$

Kaczmarz's Projection Algorithm provides ease of computation and minimal cumulative history requirements relative to a normal least squares solution. Preferably, the parameter α is calibrated to a very small value and is used to prevent a division by zero error in the algorithm. The parameter γ can be calibrated to adjust the adaptation speed with the trade-off of additional noise at a higher calibration value that results in faster adaptation. Preferably, slow adaptation is utilized to ensure stability with an observer-based control strategy as provided by the present invention to provide responsive control. For adaptation to occur, system excitation is necessary. The present invention uses the driver's demanded throttle excitations as the source for adaptation.

The current (after adaptation and applied sensor dynamics) and future (after adaptation and without sensor dynamics applied) estimated values for mass airflow provided by throttle flow model 222 are used by intake manifold filling model 224 to account for filling effects during transients which would otherwise lead to undesirable air/fuel ratio excursions. During transients, the difference between the sensed mass airflow and the in-cylinder airflow is equal to the rate of change of the air mass in the intake manifold. Under steady-state conditions, the sensed mass airflow is equal to the in-cylinder airflow. Treating the engine as a volumetric pump, using the ideal gas law, and applying conservation of mass to the intake manifold, the manifold filling dynamics can be represented as:

$$\dot{M}_{MAN} = MAF - \dot{M}_{CYL} \Rightarrow \frac{\dot{P}_{MAN}v_{MAN}}{RT_{MAN}} = MAF - \frac{\eta_v P_{MAN} V_d n}{120RT_{MAN}}$$

in the frequency domain, this is represented as:

$$\frac{M_{CYL}(s)}{MAF(s)} = \frac{1}{\tau_{MAN}s+1},\ \text{where}\ \tau_{MAN} = 120\frac{V_{MAN}}{\eta_V V_D n}$$

Discretizing the frequency domain transfer function above into the crank angle domain leads to:

$$M_{CYL_K}=(1-air\_fk)\,M_{CYL_{K-1}}+MAF_K(air\_fk)$$

where air_fk can be approximated as:

$$\frac{\eta_V V_D}{N_{CYL}V_{MAN}}$$

and where MAF represents mass airflow past the throttle body, $M_{CLY}$ represents mass airflow into the cylinder, $M_{MAN}$ represents rate of change of mass airflow in the intake manifold, $P_{MAN}$ represents intake manifold pressure, $V_{MAN}$ represents intake manifold displacement volume, $T_{MAN}$ represents intake manifold temperature, R represents gas constant, $V_D$ represents cylinder displacement volume, $\eta_V$ represents volumetric efficiency, n represents engine speed (RPM), and $\tau T_{MAN}$ represents manifold filling time constant.

While the estimated future mass airflow determined by throttle flow model 222 can be used as an input to a conventional intake manifold filling model for predicting in-cylinder air charge estimation, an observer based strategy as illustrated in FIG. 7 is preferably used to improve stability using slow adaptation while providing improved control responsiveness. The observer-based strategy illustrated ensures that steady-state stability is achieved in addition to adding responsiveness to the strategy to improve transient control. The feedback element used for manifold filling model 224 in the closed-loop observer is the current air charge calculated by manifold filling model 284 using the sensed or measured MAF 258 with appropriate integration 287. Integration provided by block 287 converts the sensed signal for MAF which is in units of 1 bm/min for the intake manifold filling model 284 which uses an air charge amount with units of 1 bm/stroke. The calculated air charge using the measured MAF signal is treated as the actual air charge after being exposed to the sensor dynamics. The current MAF estimate provided to a similar integrator 280 has already been adapted by block 270 and has sensor dynamics applied prior to being processed by manifold filling model 284 to produce a current estimated air charge. For the observer, a proportional error is then calculated by taking the difference at block 288 between the actual air charge (calculated from the sensed MAF) and the estimated air charge (calculated from the filtered current MAF estimate provided by model 222). A gain 290 is applied to the proportional error with the result used as a feed-forward term to be combined with the current and future intake air charge at blocks 282 and 292, respectively.

Figure 8:
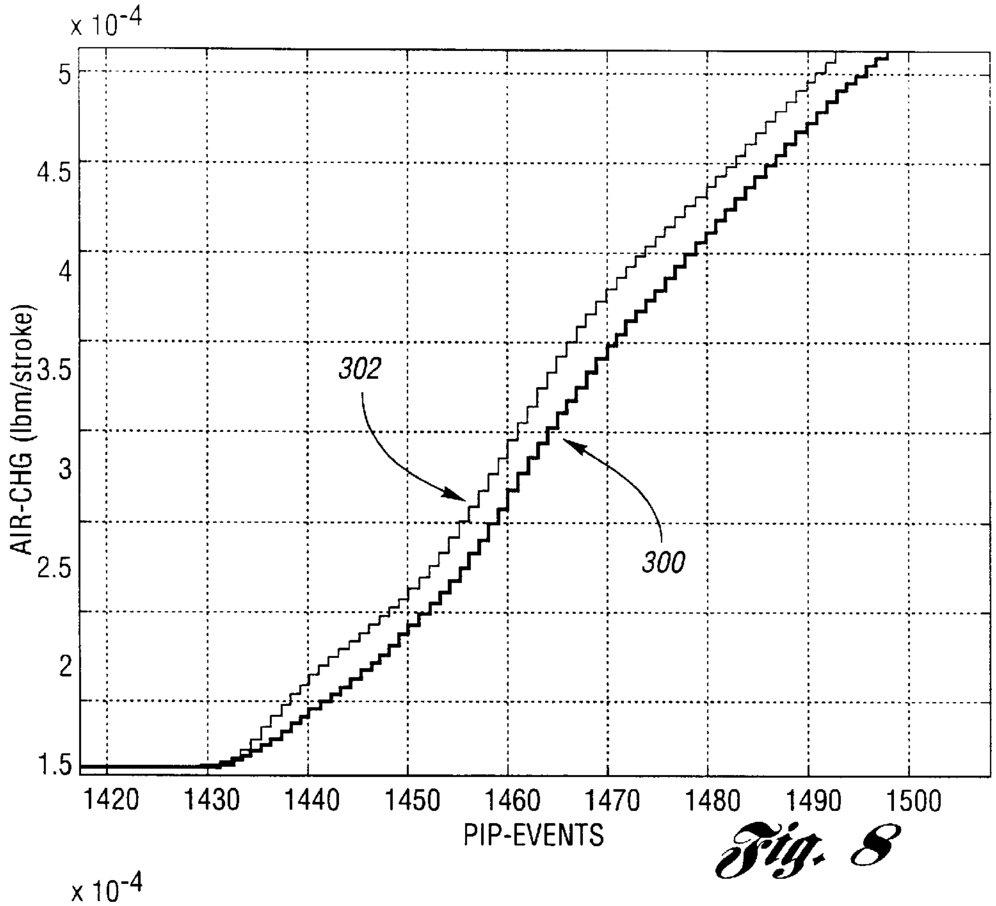
FIG. 8 is a graph illustrating improved cylinder air charge estimation for a tip-in event using a control system according to the present invention.

FIG. 8 provides a graph illustrating improved cylinder air charge estimation for a tip-in event using a control system according to the present invention. Line 300 represents a prior art approach which includes some compensation to predict airflow, such as the use of linear extrapolation to estimate airflow and calculate corresponding in-cylinder air charge for a subsequent fuel injection event. Line 302 represents the improved response using the present invention. As illustrated in FIG. 8, line 302 is not subject to the attenuation and delay imposed by sensor dynamics and system response and, therefore, results in a better prediction of actual cylinder air charge.

Figure 9:
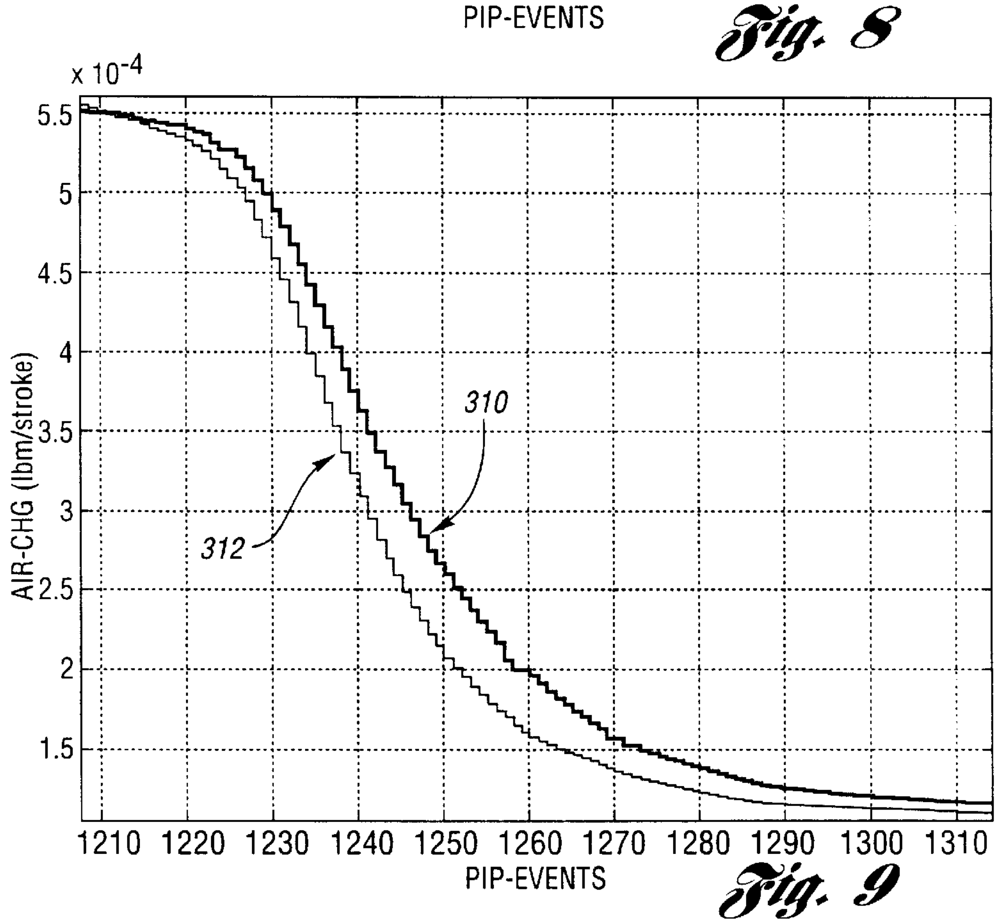
FIG. 9 is a graph illustrating improved cylinder air charge estimation for a tip-out event using a control system according to the present invention.

FIG. 9 is a graph illustrating improved cylinder air charge estimation for a tip-out event using a control system according to the present invention. Line 310 corresponds to a prior art approach which uses linear extrapolation to estimate airflow and corresponding in-cylinder air charge. Line 312 represents response of a control system utilizing techniques according to the present invention. As illustrated in FIG. 9, a control system according to the present invention provides for an improved response and more accurate estimation of the in-cylinder air charge.

Figure 10:
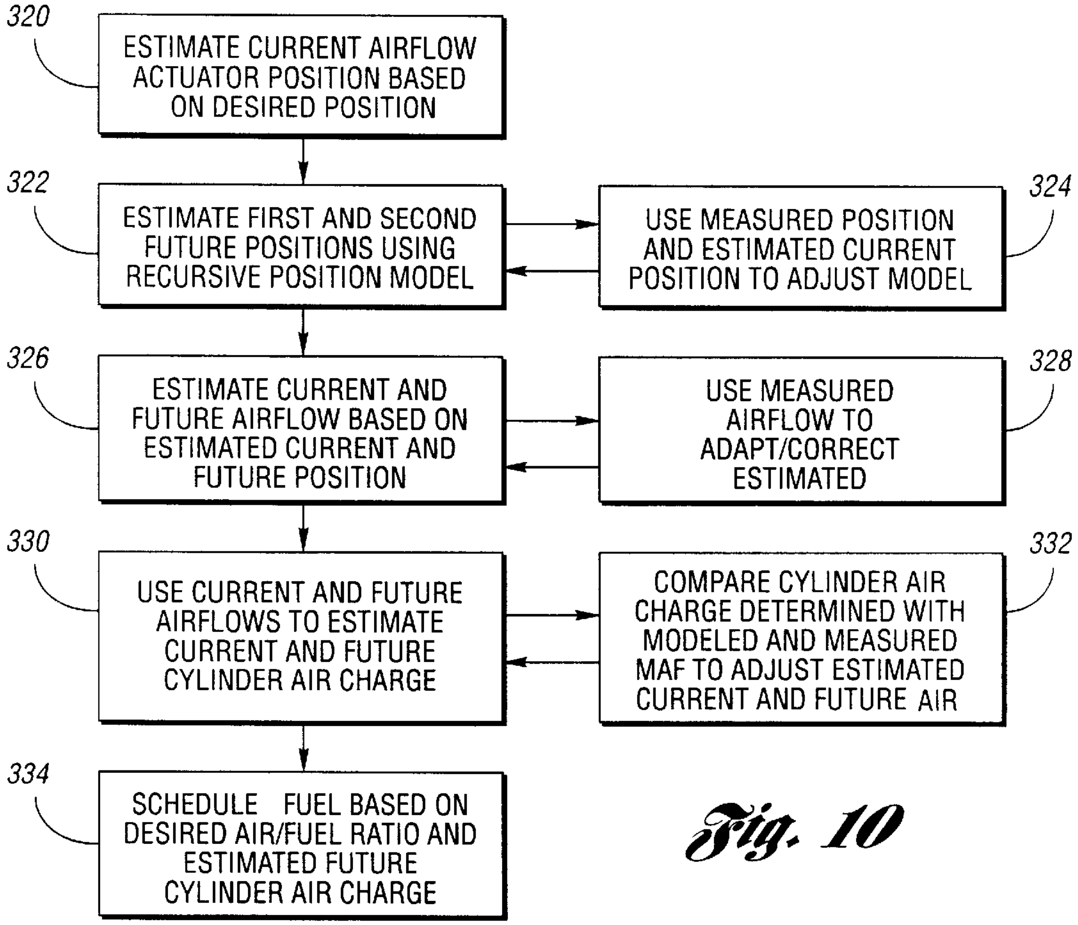
FIG. 10 is a flowchart illustrating operation of one embodiment of a system or method for controlling an internal combustion engine according to the present invention.

FIG. 10 is a flowchart illustrating operation of a system and method for air charge estimation according to the present invention. The diagram of FIG. 10 represents control logic of one embodiment of a system or method according to the present invention. As will be appreciated by one of ordinary skill in the art, the diagram of FIG. 10 may represent any one or more of a number of known processing strategies such as event-driven, interrupt-driven, multi-tasking, multi-threading, and the like. As described above, the present invention preferably utilizes both an event-driven strategy triggered by a particular event, i.e., intake or fuel injection corresponding to a particular crank angle, in combination with time-domain, fixed-interval interrupt processing, such as used for calculation of a desired throttle angle, for example. Thus, various steps or functions illustrated may be performed in the sequence illustrated, in parallel, or in some cases omitted. Likewise, the order of processing is not necessarily required to achieve the objects, features, and advantages of the present invention, but is provided for ease of illustration and description. Although not explicitly illustrated in FIG. 10, one of ordinary skill in the art will recognize that one or more of the illustrated steps or functions may be repeatedly performed depending upon the particular processing strategy being used.

Preferably, the control logic illustrated in FIG. 10 is primarily implemented in software which is executed by a microprocessor-based engine controller. Of course, the control logic may be implemented in software, hardware, or a combination of software and hardware depending upon the particular application. When implemented in software, the control logic is preferably provided in a computer-readable storage medium and in stored data representing instructions executed by a computer to control the engine. The computer-readable storage medium or media may be any of a number of known physical devices which utilize electric, magnetic, and/or optical devices to temporarily or persistently store executable instructions and associated calibration information, operating variables, parameters, and the like.

In the embodiment of FIG. 10, block 320 represents estimating the current airflow actuator position based on a corresponding desired position. In one embodiment of the present invention, the airflow actuator is an electronically controlled throttle valve with the throttle angle (TA) estimated as determined by block 320 and described in greater detail above.

First and second future positions are estimated using a recursive position model as represented by block 322. Preferably, a measured position of the throttle valve is used in conjunction with the estimated current position and estimated future positions to adjust the model as represented by block 324. The current and second future estimates of the actuator position are used to determine corresponding airflows as represented by block 326. A measured airflow may be used in conjunction with the estimated airflows to adapt/correct the estimates as represented by block 328. The estimated current and future airflows are used to determine an estimate for the current and future cylinder air charge as represented by block 330. Preferably, the cylinder air charge values determined with the estimated and measured mass airflow are used to adjust the estimated current and future integrated mass airflow values as represented by block 332. The estimated in-cylinder air charge for a future fuel injection event is used to schedule an appropriate quantity of fuel based on a desired air/fuel ratio as represented by block 334.

The air charge estimation strategy of the present invention provides significant opportunities for improving air charge estimation by taking advantage of electronically controlled throttle technology and using a dynamic model-based control approach integrating observer-based and adaptive control strategies. More precise air/fuel ratio control resulting from improved air charge estimation can improve fuel economy, reduce feed gas emissions during transients, and may result in improved drivability. The dynamic airflow actuator model of the present invention used in a recursive manner in conjunction with an adaptive airflow model and observer-based manifold flow model provides an improved estimate of cylinder air charge for a future engine event.

While the best mode for carrying out the invention has been described in detail, those familiar with the art to which this invention relates will recognize various alternative designs and embodiments for practicing the invention as defined by the following claims.

What is claimed is:

1. A system for controlling an internal combustion engine having a plurality of cylinders, the system comprising:

at least one electronically controlled airflow actuator;

at least one actuator position sensor for providing a signal indicative of position of one or more of the electronically controlled airflow actuators;

an airflow sensor for providing a signal indicative of intake airflow;

a controller in communication with the at least one electronically controlled airflow actuator, the at least one position sensor, and the airflow sensor, the controller generating an estimate of cylinder air charge for a future fuel injection event based on a dynamic actuator model for the at least one airflow actuator and modifying parameters of the dynamic actuator model based on a difference between an estimated current position of the at least one airflow actuator and the signal provided by the actuator position sensor.

2. The system of claim 1 wherein the controller generates an estimate of future airflow based on a future actuator position determined by the dynamic actuator model, air charge temperature, barometric pressure, and manifold pressure.

3. The system of claim 1 wherein the at least one electronically controlled airflow actuator comprises an electronically controlled throttle valve.

4. The system of claim 1 wherein the at least one electronically controlled airflow actuator comprises a plurality of intake valves or exhaust valves.

5. A computer readable storage medium having stored data representing instructions executable by a computer to control an internal combustion engine, the computer readable storage medium comprising:

instructions for estimating future throttle valve position corresponding to a future fuel injection event using a throttle valve position model;

instructions for estimating current throttle valve position using the throttle valve position model;

instructions for adjusting the throttle valve position model based on a difference between the estimated current throttle valve position and a measured throttle valve position;

instructions for estimating a future intake airflow corresponding to the estimated future throttle valve position; and instructions for estimating cylinder air charge based on a manifold filling model for the estimated intake airflow, the cylinder air charge corresponding to the future fuel injection event to improve the air/fuel ratio control during transient operating conditions.

6. The computer readable storage medium of claim 5 further comprising instructions for determining duration of a future fuel injection event based on a desired air/fuel ratio and the estimated cylinder air charge corresponding to the future fuel injection event.

7. The computer readable storage medium of claim 5 further comprising:

instructions for estimating a current intake airflow corresponding to the estimated current throttle valve position;

instructions for comparing the estimated current intake airflow with a measured intake airflow to generate at least one correction factor; and instructions for adjusting the estimated future intake airflow based on the at least one correction factor.

8. A method for controlling an internal combustion engine having at least one intake airflow actuator for regulating airflow into at least one cylinder, the method comprising:

predicting position of the airflow actuator using an actuator model, the position corresponding to a subsequent injection of fuel into the cylinder; and estimating air charge in the cylinder for the subsequent injection of fuel based on the predicted position of the airflow actuator.

9. The method of claim 8 further comprising:

estimating intake airflow for the subsequent injection of fuel using an airflow model based on the predicted position of the airflow actuator.

10. The method of claim 9 wherein the step of estimating air charge in the cylinder comprises estimating air charge in the cylinder based on the estimated intake airflow.

11. The method of claim 9 further comprising:

estimating current intake airflow based on an estimated current position of the airflow actuator as determined by the actuator model;

comparing the estimated current intake airflow to a measured intake airflow to generate an airflow modeling error; and adjusting the airflow model based on the airflow modeling error.

12. The method of claim 11 wherein the step of comparing comprises filtering the estimated current intake airflow using a filter which simulates response characteristics of an airflow sensor used to determine the measured intake airflow.

13. The method of claim 9 further comprising:

estimating current intake airflow based on an estimated current position of the airflow actuator as determined by the actuator model;

comparing the estimated current intake airflow to a measured intake airflow to generate an airflow modeling error; and correcting output of the airflow model based on the airflow modeling error.

14. The method of claim 8 further comprising:

estimating a current position of the airflow actuator using the actuator model;

comparing the estimated current position of the airflow actuator to a measured position of the airflow actuator to generate an actuator modeling error; and adjusting the actuator model based on the actuator modeling error.

15. The method of claim 8 wherein the step of predicting comprises predicting position of a throttle valve.

16. The method of claim 8 wherein the step of predicting comprises predicting position of at least one intake or exhaust valve.

17. The method of claim 8 further comprising:

estimating current cylinder air charge based on a manifold filling model corresponding to an estimated current position of the airflow actuator as determined by the actuator model and an estimated current intake airflow as determined by the airflow model.

18. The method of claim 17 further comprising:

generating a second estimate of current cylinder air charge based on a measured intake airflow using the manifold filling model;

comparing the second estimate of current cylinder air charge with the estimate based on the actuator and airflow models to generate a manifold filling modeling error; and adjusting estimated integrated mass airflows determined by the airflow model based on the manifold filling modeling error.

19. A method for controlling an internal combustion engine having an electronically controlled throttle valve to improve air/fuel ratio control during transient operating conditions, the method comprising:

estimating future throttle valve position corresponding to a future fuel injection event using a throttle valve position model;

estimating current throttle valve position using the throttle valve position model;

adjusting the throttle valve position model based on a difference between the estimated current throttle valve position and a measured throttle valve position;

estimating a future intake airflow corresponding to the estimated future throttle valve position; and estimating cylinder air charge based on a manifold filling model for the estimated intake airflow, the cylinder air charge corresponding to the future fuel injection event to improve the air/fuel ratio control during transient operating conditions.

20. The method of claim 19 further comprising:

determining duration for a future fuel injection event based on a desired air/fuel ratio and the estimated cylinder air charge corresponding to the future fuel injection event.

21. The method of claim 19 further comprising:

estimating a current intake airflow corresponding to the estimated current throttle valve position;

comparing the estimated current intake airflow with a measured intake airflow to generate at least one correction factor; and adjusting the estimated future intake airflow based on the at least one correction factor.

22. The method of claim 21 wherein the step of comparing comprises:

comparing the estimated current intake airflow with a measured intake airflow to generate at least one correction factor for a corresponding optimization method.

23. The method of claim 19 wherein the step of estimating a future intake airflow comprises estimating the future intake airflow using a regressed airflow model.

24. The method of claim 19 wherein the step of estimating a future intake airflow comprises estimating a future intake airflow based on current indicators for barometric pressure, air charge temperature, and manifold pressure.

25. The method of claim 19 further comprising:

estimating cylinder air charge corresponding to current throttle valve position and associated current airflow determined by the throttle valve position model and airflow model, respectively;

comparing the estimated cylinder air charge to a second estimate generated using the manifold filling model and a measured airflow to generate a manifold filling model error; and modifying the estimated future cylinder air charge based on the manifold filling model error.

* * * * *